United States Patent
Galbiati

(10) Patent No.: US 7,542,262 B2
(45) Date of Patent: Jun. 2, 2009

(54) APPARATUS FOR DRIVING AN ELECTROMAGNETIC LOAD

(75) Inventor: Ezio Galbiati, Agnadello (IT)

(73) Assignee: STMicroelectronics s.r.l., Agrate Brianza (MI) (IT)

( * ) Notice: Subject to any disclaimer, the term of this patent is extended or adjusted under 35 U.S.C. 154(b) by 131 days.

(21) Appl. No.: 11/234,973

(22) Filed: Sep. 26, 2005

(65) Prior Publication Data

US 2006/0087363 A1 Apr. 27, 2006

(30) Foreign Application Priority Data

Sep. 27, 2004 (EP) .................................. 04425713

(51) Int. Cl.
*H01H 47/00* (2006.01)
(52) U.S. Cl. ..................... 361/152; 361/139; 361/153
(58) Field of Classification Search ................ 361/139, 361/152–153; 360/46, 67, 75, 77.04, 78.09, 360/78.12; 327/110, 123, 588; 318/293, 318/254, 599, 811, 138, 139, 245, 439, 590, 318/591, 603, 611; 363/14, 41, 98, 131, 363/132
See application file for complete search history.

(56) References Cited

U.S. PATENT DOCUMENTS

| | | | | | |
|---|---|---|---|---|---|
| 5,723,963 | A | * | 3/1998 | Li et al. | 318/590 |
| 5,838,515 | A | * | 11/1998 | Mortazavi et al. | 360/78.12 |
| 5,917,720 | A | * | 6/1999 | Galbiati | 363/98 |
| 6,023,143 | A | * | 2/2000 | Salina et al. | 318/599 |
| 6,374,043 | B1 | * | 4/2002 | El-Sherif et al. | 388/801 |
| 6,542,324 | B1 | * | 4/2003 | Galbiati et al. | 360/75 |
| 6,631,045 | B1 | * | 10/2003 | Pedrazzini | 360/75 |
| 6,804,131 | B2 | * | 10/2004 | Galbiati et al. | 363/132 |
| 6,989,955 | B2 | * | 1/2006 | Ziemer et al. | 360/75 |
| 7,092,197 | B2 | * | 8/2006 | El-Sherif et al. | 360/75 |
| 2003/0155896 | A1 | * | 8/2003 | Ezio et al. | 323/280 |
| 2004/0240135 | A1 | * | 12/2004 | Wong et al. | 361/93.1 |

FOREIGN PATENT DOCUMENTS

EP 1 339 163 8/2003

OTHER PUBLICATIONS

European Search Report dated Feb. 22, 2005 for European Application No. 04425713.

* cited by examiner

*Primary Examiner*—Stephen W Jackson
*Assistant Examiner*—Terrence R Willoughby
(74) *Attorney, Agent, or Firm*—Lisa K. Jorgenson; Stephen Bongini; Fleit Gibbons Gutman Bongini & Bianco, P.L.

(57) ABSTRACT

The present invention refers to an apparatus for driving an electromagnetic load. The apparatus comprises a power stage comprising at least one first and one second transistor half-bridge and the electromagnetic load is arranged between the first and the second half-bridge. The apparatus comprises a first and a second device suitable for driving in linear modality respectively the first and the second half-bridge and another device suitable for driving in pulse width modulation modality the first half-bridge, first switch means suitable for connecting the first half-bridge to the first device or to the other device in response to a control signal, second switch means suitable for connecting the second half-bridge to the second device in response to the control signal. The apparatus has an input signal and comprises a further device suitable for connecting the second half-bridge to a first reference voltage and to a second reference voltage, with said first reference voltage greater than said second reference voltage, when said first half-bridge is connected to the other device suitable for driving it in pulse width modulation modality.

16 Claims, 3 Drawing Sheets

APPARATUS FOR DRIVING AN ELECTROMAGNETIC LOAD

This application claims priority from prior European Patent Application No. 04 425 713.7, filed Sep. 27, 2004.

The present invention refers to an apparatus for driving an electromagnetic load.

Apparatus for driving electromagnetic loads are generally known, for example, a voice coil motor used in hard disks of computers. Said driving apparatus generally comprise power stages in bridge configuration operating in class AB for the known properties of good linearity and distortion of crossover; nevertheless said apparatus present a high dissipation of power of the output stage.

To avoid the above-mentioned problem driving apparatus in current have been produced which work by means of a pulse width modulation procedure (PWM). A driving apparatus of this type is described in U.S. Pat. No. 5,917,720; said apparatus comprises a PWM amplifier stage with two outputs that have a suitably variable duty cycle to control the current in the electromagnetic load.

A limitation in the practical implementation of said apparatus in the field of hard disks for computer is the possibility of a degradation of the performance of the same computer due to the use of the PWM procedure given that the connection tracks of the two outputs of the power stage with the load, the winding of the voice coil motor, are positioned inside the same flexible cable that conveys the reading and writing signals of the heads.

To avoid said inconvenience apparatus capable of driving the output stage in bridge configuration both in linear modality and in PWM modality have been produced. The linear modality is used when the heads of the rigid disk are held on track for the reading or writing operations of the data while the PWM modality is used during the track jumps when a higher driving current is necessary. The apparatus of this type entail the use of two pre-driver driving circuits of the output stage, precisely two pre-drivers for every half-bridge, one of which serves for driving in PWM modality and the other for driving in linear modality. Nevertheless the use of said two pre-drivers determines an increase of the silicon area needed for producing the apparatus.

In view of the state of the technique described, object of the present invention is to provide a device for driving a bridge that permits the occupation of a smaller silicon area.

In accordance with the present invention, this object is achieved by means of an apparatus for driving an electromagnetic load, comprising a power stage comprising at least one first and one second transistor half-bridge and said electromagnetic load being positioned between said first and second half-bridge, a first and a second device suitable for driving in linear modality respectively said first and said second half-bridge and another device suitable for driving in pulse width modulation modality said first half-bridge, first switch means suitable for connecting said first half-bridge to said first device or to said other device in response to a control signal, second switch means suitable for connecting said second half-bridge to said second device in response to said control signal, said apparatus having an input signal, characterised in that it comprises a further device suitable for connecting said second half-bridge to a first reference voltage and to a second reference voltage, said first reference voltage being greater than said second reference voltage, when said first half-bridge is connected to said other device suitable for driving it in pulse width modulation modality.

The characteristics and advantages of the present invention will appear evident from the following detailed description of an embodiment thereof, illustrated as non-limiting example in the enclosed drawings, in which.

Figure 1:
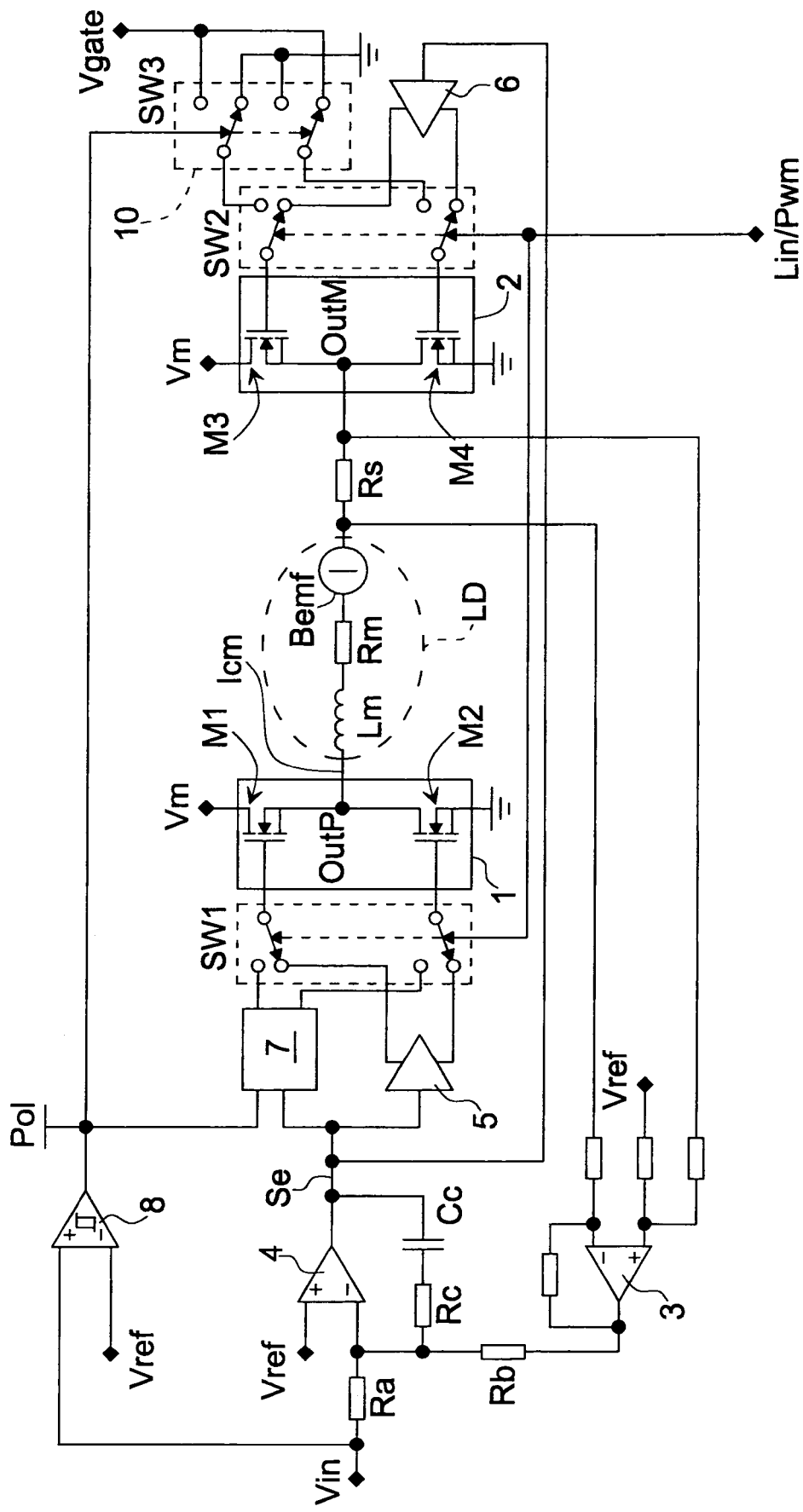
FIG. 1 is a circuit diagram of a bridge driving device according to the present invention.

With reference to FIG. 1 an apparatus for driving a bridge in accordance with the present invention is shown. Said apparatus comprises an electromagnetic load LD, generally a voice coil motor schematised as a series of a coil Lm, a resistance Rm and a generator of a counter-electromagnetic force Bemf, that is driven by a power amplifier constituted by two half-bridges 1 and 2. The half-bridge 1 comprises two transistors, preferably two MOS transistors M1 and M2, arranged in series between a supply voltage Vm and ground and the half-bridge 2 comprises other two transistors, preferably two MOS transistors M3 and M4, arranged in series between a supply voltage Vm and ground. The load LD is arranged between a terminal OutP in common between the transistors M1 and M2 and a terminal of a sensor resistance Rs having its other terminal connected to a terminal OutM in common between the transistors M3 and M4.

The terminals of the resistance Rs are connected to the inverting and non-inverting terminals of a sense amplifier 3; at the non-inverting terminal of amplifier 3 a reference voltage Vref is also present. The voltage Vref is chosen in function of the working point of the circuit, preferably said voltage has a value of half the supply voltage of the devices (4, 5, etc.) that compose the apparatus of FIG. 1; the voltage Vref can be worth for example 2.5V or 3.3V.

The output signal of the sense amplifier 3 is sent through a resistance Rb to the inverting terminal of an error amplifier 4. The inverting terminal of the amplifier 4 is connected to the output terminal of the amplifier by means of a series of a resistance Rc and a capacitor Cc; an input voltage Vin is applied by means of a resistance Ra to the inverting terminal of the amplifier 4 while there is a voltage Vref on the non-inverting terminal.

The output signal Se of the error amplifier 4 drives two pre-driver circuits 5, 6 for driving in linear modality the respective half-bridges 1 and 2. The same output signal Se of the amplifier 4 drives a device 7 for driving the half-bridge 1 in PWM modality. The device 7 comprises a PWM converter and a pre-driver circuit PWM.

The apparatus comprises a hysteresis comparator 8 having the inverting terminal connected to the input voltage Vin and the non-inverting terminal connected to the reference voltage Vref. The output signal of the comparator 8 is applied to a device 10.

A couple of switches SW1 permits the connection of the output of the pre-driver circuit 5 or of the output of the device 7 to the gate terminals of the transistors M1 and M2 belonging to the half-bridge 1; the output of the pre-driver circuit 5 and the output of the device 7 comprise two output terminals on which a voltage signal and its negated signal are respectively present so as to keep only one of the two transistors M1 and M2 on.

Another couple of switches SW2 permits the connection of the output of the pre-driver circuit 6 or of the output of the device 10 to the gate terminals of the transistors M3 and M4 belonging to the half-bridge 2; the output of the pre-driver circuit 5 comprises two output terminals on which a voltage signal and its negated signal are respectively present so as to keep only one of the two transistors M1 and M2 on. The couples of switches SW1 and SW2 are driven by a signal Lin/PWM that permits both the half-bridges 1 and 2 to be driven in linear modality or in PWM modality.

More precisely in the case in which the signal Lin/PWM selects driving of the bridges 1 and 2 in linear modality, the same signal commands the connection, by means of switches SW1 and SW2, of the gate terminals of the transistors M1, M2 and M3, M4 to the output terminals of the respective pre-driver circuits 5 and 6.

In the case in which the signal Lin/PWM selects driving the bridges 1 and 2 in PWM modality, the same signal commands switches SW1 to connect the gate terminals of the transistors M1, M2 to the output terminals of the device 7 and switches SW2 to connect the gate terminals of the transistors M3 and M4 to the output terminals of the device 10.

The latter comprises a couple of switches SW3 suitable for connecting the couple of the output terminals of the device 10 one to ground GND and the other to a positive reference voltage Vgate or vice versa in function of the polarity of the current Icm that passes through the electromagnetic load LD and that is set by the input voltage Vin; the voltage Vgate is such to keep transistor M3 or M4 on. In fact switches SW3 are driven by the output signal of the comparator 8 to connect the gate terminals of the transistors M3 and M4 respectively to the voltage Vgate and to ground GND or vice versa so as to keep one of said two transistors on during the operating modality in PWM and in function of the polarity of the current Icm.

Figure 2:
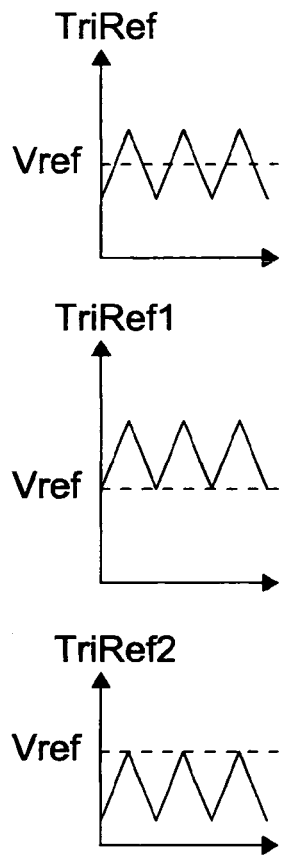
FIG. 2 is a circuit diagram of the PWM converter used in the circuit of FIG. 1.
Figure 2:
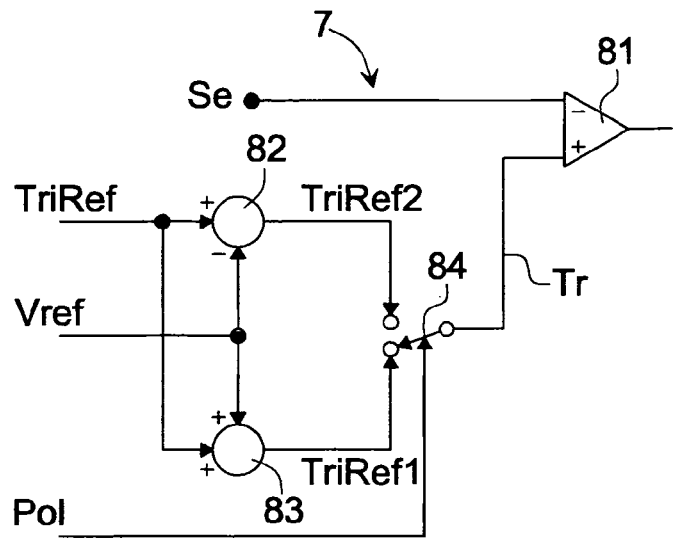

The PWM converter of the device 7 can be produced as shown in FIG. 2. It comprises a comparator 81 suitable for comparing the signal Se in output from the error amplifier 4 that is in input to the inverting terminal, and another signal Tr that is on the non-inverting terminal of the comparator 81. A signal TriRef having a path referred to Vref, preferably a triangular path, is sent to two adder branch points 82 and 83 that respectively add and subtract the reference signal Vref to said signal TriRef obtaining two signals TriRef1 and TriRef2. A switch 84 driven by the signal Pol in output from the comparator 8 permits the connection of signal TriRef1 or of signal TriRef2 to the non-inverting terminal of the comparator 81; in this manner the signal Tr is constituted by the signal TriRef1 or by the signal TriRef2. In FIG. 2 the signals TriRef, TriRef1 and TriRef2 having triangular path are shown.

The frequency of the signal TriRef defines the frequency of switching the signal PWM generated by the comparator 81 while its peak-peak width determines the gain of the pre-driver circuit PWM associated to the PWM converter (the output of the comparator 81 is the input of the pre-driver PWM of the device 7). The gain of the pre-driver PWM must be equal to the gain of the pre-driver 5 to minimize the effects of distortion and discontinuity to the passage between the two operating modalities.

The signal Pol that indicates the polarity of the current that has to be controlled will act on the switch 84 to permit the connection of non-inverting terminal of the comparator 81 to the signal TriRef1 when the current to be controlled is positive while it will act on the switch 84 to permit the connection of non-inverting terminal of the comparator 81 to the signal TriRef2 when the current to be controlled is negative. The signal Pol is therefore used to apply a translation of the reference signal to the triangular path.

Similar functioning is obtained if a translation of the output signal of the error amplifier is made in function of the signal Pol with the reference to the triangular wave constant.

Figure 3:
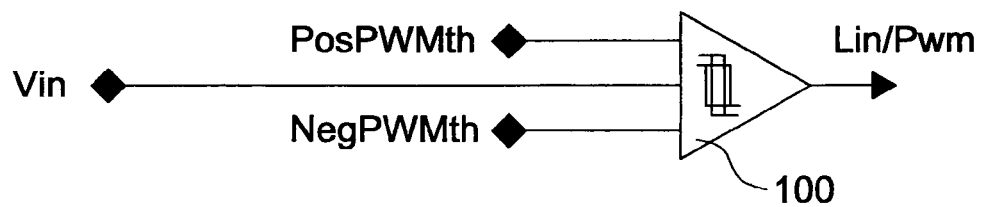
FIG. 3 is a diagram of the device generating the signal for the switching from the PWM modality to the linear modality or vice versa.

In FIG. 3 a device 100 suitable for generating the signal Lin/PWM is shown. Said device 100 comprises a window comparator having two voltage thresholds PosPWM and NegPWM set from outside; the signal Vin is applied to the input of the comparator. When the value of the signal Vin is found between the two voltage thresholds PosPWM and NegPWM the signal Lin/PWM commands operating in linear modality while when the value of the signal Vin is lower than the voltage threshold NegPWM or higher than the voltage threshold PosPWM the signal Lin/PWM commands operating in PWM modality.

The voltage thresholds PosPWM and NegPWM must be selected in such a way that the maximum current controlled with the power stage 1, 2 driven in linear modality is greater than the maximum current needed to keep the heads of a rigid disk on track under the worst conditions.

With the apparatus of FIG. 1 the sense resistance Rs is connected to the half-bridge 2 that is not controlled in PWM modality. In this manner the sense amplifier 3 operates with a constant common mode voltage given that the voltage on the terminal OutM is at the value Vgate in the case of negative current and at ground in the case of positive current.

Figure 4:
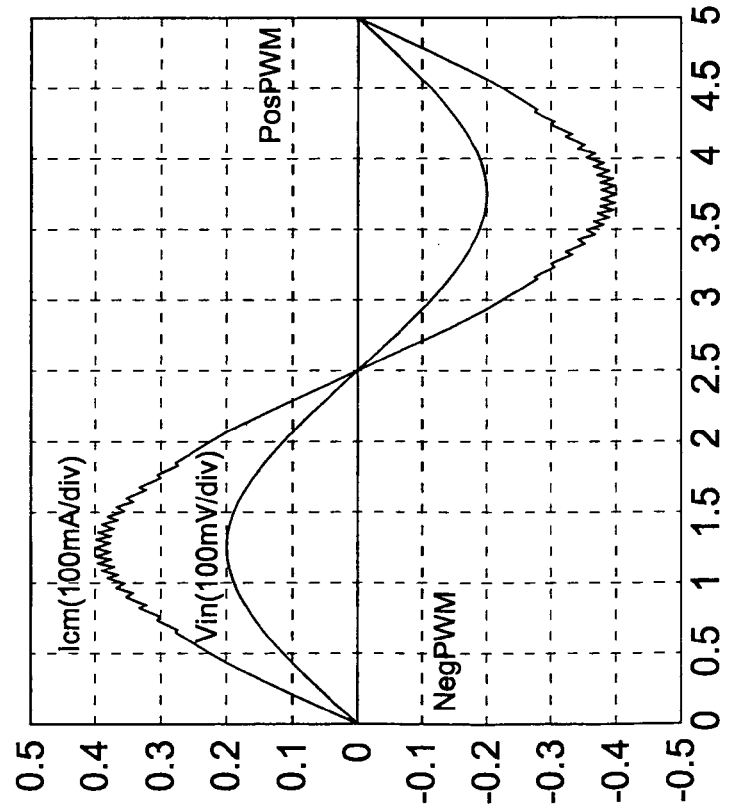
FIG. 4 is a diagram of the time trend of the output current of the circuit of FIG. 1 and the input voltage.

In FIG. 4 the time paths of the current Icm (with a value of 100 mA per division) and of the input voltage Vin (with a value of 100 mV per division) are shown, obtained by means of simulation on the apparatus of FIG. 1. In FIG. 4 the two thresholds PosPWM and NegPWM are also highlighted that determine the change of the operating modality from linear to PWM. When the value of the voltage Vin is between said two thresholds there is the linear operating modality for the half-bridges 1 and 2 and excellent cross-over performances to the passage of the current for zero are obtained. When the value of the voltage Vin is lower than threshold NegPWM or higher than the threshold PosPWM there is the operating modality PWM and a decrease of the dissipated power is obtained.

Figure 5:
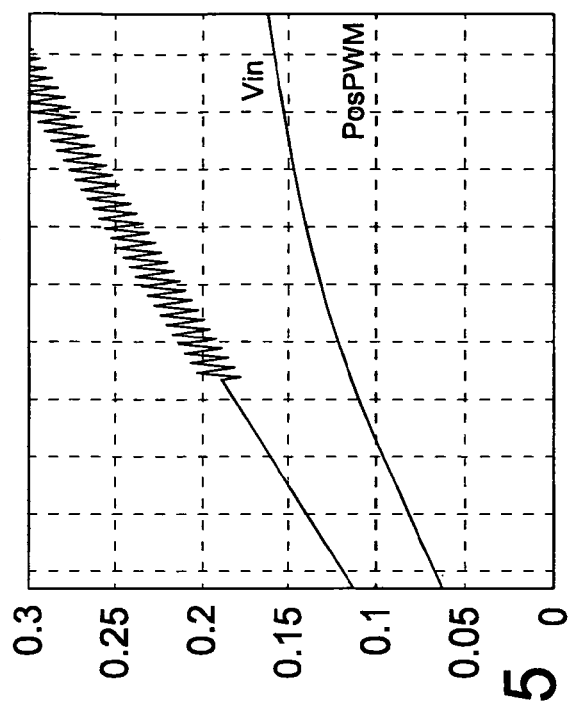
FIGS. 5 and 6 show in more detail several zones of the graph of FIG. 4.
Figure 6:
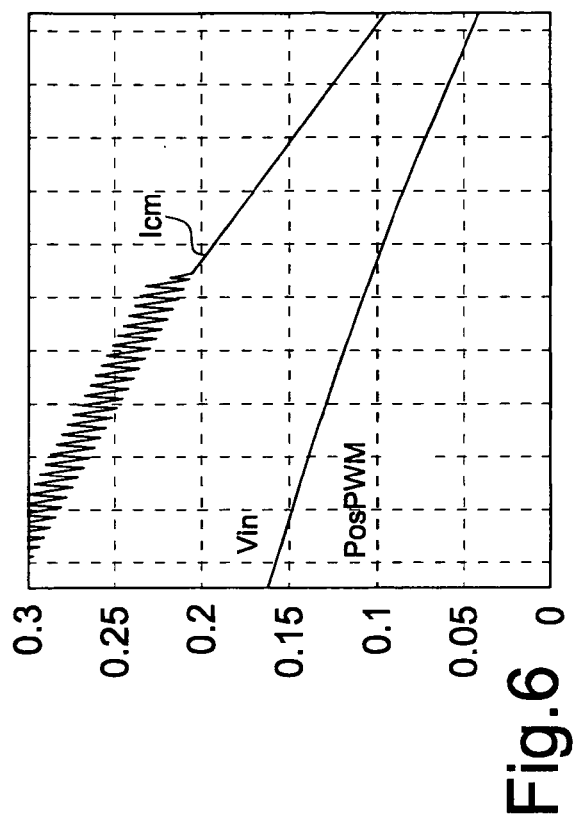

In FIGS. 5 and 6 the areas of the graph where there is the change of modality from linear to PWM (threshold PosPWM in FIG. 5) and where there is the change of modality from PWM to linear (threshold PosPWM in FIG. 6) are shown more in detail.

The invention claimed is:

1. Apparatus for driving an electromagnetic load, said apparatus comprising:
   a power stage comprising at least one first transistor half-bridge and at least one second transistor half-bridges, said electromagnetic load being coupled between said first and second half-bridges,
   a first device and a second device suitable for driving in linear modality respectively said first and said second half-bridges,
   another device suitable for driving in pulse width modulation modality said first half-bridge,
   first switch means suitable for connecting said first half-bridge to said first device or to said other device in response to a control signal,
   second switch means suitable for connecting said second half-bridge to said second device in response to said control signal, said apparatus having an input signal, and
   a further device suitable for connecting said second half-bridge to a first reference voltage and to a second reference voltage when said first half-bridge is connected to said other device suitable for driving it in pulse width modulation modality, said first reference voltage being greater than said second reference voltage, wherein said first half-bridge comprises at least one first transistor having at least one first drivable terminal, and at least one second transistor having at least one second drivable terminal, said second half-bridge comprises at least one third transistor having at least one third drivable terminal, and at least one fourth transistor having at least one fourth drivable terminal, the first device and the second device driving in linear modality said first and said second half-bridges comprises said first device driving the first drivable terminal of the first transistor and the second drivable terminal of the second transistor of the first half-bridge, and said second device driving the third drivable terminal of the third transistor and the fourth drivable terminal of the fourth transistor of the second half-bridge, and the other device driving in pulse width modulation modality said first half-bridge comprises the other device driving the first drivable terminal of the first transistor and the second drivable terminal of the second transistor of the first half-bridge, and the further device connecting one of the third drivable terminal of the third transistor and the fourth drivable terminal of the fourth transistor to the first reference voltage and connecting the other of the third drivable terminal of the third transistor and the fourth drivable terminal of the fourth transistor to the second reference voltage.

2. Apparatus according to claim 1, wherein said further device is suitable for connecting said at least one third drivable terminal and said at least one fourth drivable terminal of said second half-bridge to said first reference voltage and to said second reference voltage or vice versa as a function of the polarity of a current signal that passes through said electromagnetic load.

3. Apparatus for driving an electromagnetic load, said apparatus comprising:

a power stage comprising at least one first and one second transistor half-bridge, said electromagnetic load being arranged between said first and second half-bridges, a first and a second device suitable for driving in linear modality respectively said first and said second half-bridges, another device suitable for driving in pulse width modulation modality said first half-bridge, first switch means suitable for connecting said first half-bridge to said first device or to said other device in response to a control signal, second switch means suitable for connecting said second half-bridge to said second device in response to said control signal, said apparatus having an input signal, and a further device suitable for connecting said second half-bridge to a first reference voltage and to a second reference voltage when said first half-bridge is connected to said other device suitable for driving it in pulse width modulation modality, said first reference voltage being greater than said second reference voltage, wherein said second half-bridge comprises at least one first and at least one second transistor having at least one first and at least one second drivable terminal, said further device being suitable for connecting said at least one first drivable terminal and said at least one second drivable terminal to said first reference voltage and to said second reference voltage or vice versa as a function of the polarity of a current signal that passes through said electromagnetic load, and said further device comprises a comparator suitable for comparing said input signal of the apparatus with a further reference signal, and further switch means for connecting said at least one first drivable terminal and said at least one second drivable terminal to the first reference voltage and to the second reference voltage or vice versa in response to the output signal from said comparator.

4. Apparatus for driving an electromagnetic load, said apparatus comprising:

a power stage comprising at least one first and one second transistor half-bridge, said electromagnetic load being arranged between said first and second half-bridges, a first and a second device suitable for driving in linear modality respectively said first and said second half-bridges, another device suitable for driving in pulse width modulation modality said first half-bridge, first switch means suitable for connecting said first half-bridge to said first device or to said other device in response to a control signal, second switch means suitable for connecting said second half-bridge to said second device in response to said control signal, said apparatus having an input signal, a further device suitable for connecting said second half-bridge to a first reference voltage and to a second reference voltage when said first half-bridge is connected to said other device suitable for driving it in pulse width modulation modality, said first reference voltage being greater than said second reference voltage, a sensor resistance arranged between said electromagnetic load and said second half-bridge, a sense amplifier having its input terminals coupled with the terminals of said sensor resistance, and an operational error amplifier having an inverting input terminal coupled with the output terminal of the sense amplifier and with said input signal, and a non-inverting input terminal coupled with said further reference signal, the output terminal of said operational error amplifier being coupled with said first and second devices and with said other device suitable for driving said first half-bridge in pulse width modulation modality.

5. Apparatus according to claim 2, further comprising means for automatically generating said control signal as a function of said current signal that passes through the electromagnetic load.

6. Apparatus for driving an electromagnetic load, said apparatus comprising:

a power stage comprising at least one first and one second transistor half-bridge, said electromagnetic load being arranged between said first and second half-bridges, a first and a second device suitable for driving in linear modality respectively said first and said second half-bridges, another device suitable for driving in pulse width modulation modality said first half-bridge, first switch means suitable for connecting said first half-bridge to said first device or to said other device in response to a control signal, second switch means suitable for connecting said second half-bridge to said second device in response to said control signal, said apparatus having an input signal, a further device suitable for connecting said second half-bridge to a first reference voltage and to a second reference voltage when said first half-bridge is connected to said other device suitable for driving it in pulse width modulation modality, said first reference voltage being greater than said second reference voltage, and means for automatically generating said control signal as a function of a current signal that passes through the electromagnetic load, wherein said second half-bridge comprises at least one first and at least one second transistor having at least one first and at least one second drivable terminal, said further device being suitable for connecting said at least one first drivable terminal and said at least one second drivable terminal to said first reference voltage and to said second reference voltage or vice versa as a function of the polarity of the current signal that passes through said electromagnetic load, and said means for automatically generating said control signal comprises a window comparator having a first and a second voltage threshold and receiving in input said input signal of the apparatus so that when the value of said input signal is between said two thresholds said control signal permits the connection of said first and second devices to the respective first and second half-bridges while when the value of said input signal is outside the window formed by said two thresholds said control signal permits the connection of said other device with said first half-bridge and of said further device with said second half-bridge.

7. Apparatus according to claim 4, wherein said other device comprises a comparator suitable for comparing the output signal from said operational error amplifier with another reference signal having a path alternated between a minimum value and a maximum value, said other reference signal being subtracted or added to a constant signal as a function of the polarity of a current signal that passes through said electromagnetic load.

8. Apparatus according to claim 7, wherein said other reference signal is a translated triangular path signal of said constant signal.

9. Apparatus according to claim 1,
wherein the first device and the second device drive said first and said second half-bridges in linear modality when the input signal of the apparatus is between a first threshold and a second threshold, and
the other device drives said first half-bridge in pulse width modulation modality when the input signal is outside a window formed by the first and second thresholds.

10. Apparatus according to claim 1, wherein said further device comprises:
a comparator suitable for comparing said input signal of the apparatus with a further reference signal, and
further switch means for connecting at least one first drivable terminal of the second half-bridge to the first reference voltage and at least one second drivable terminal of the second half-bridge to the second reference voltage, or vice versa, in response to the output signal from said comparator.

11. Apparatus according to claim 1, further comprising:
a sensor resistance coupled between said electromagnetic load and said second half-bridge,
a sense amplifier having the its input terminals coupled with the terminals of said sensor resistance, and
an operational error amplifier having an inverting input terminal coupled with the output terminal of the sense amplifier and with said input signal, and a non-inverting input terminal coupled with said further reference signal, the output terminal of said operational error amplifier being coupled with said first and second devices and with said other device suitable for driving said first half-bridge in pulse width modulation modality.

12. Apparatus according to claim 1, further comprising a window comparator for automatically generating said control signal, the window comparator having a first and a second voltage threshold and receiving in input said input signal of the apparatus so that when the value of said input signal is between said two thresholds said control signal permits the connection of said first and second devices to the respective first and second half-bridges while when the value of said input signal is outside the window formed by said two thresholds said control signal permits the connection of said other device with said first half-bridge and of said further device with said second half-bridge.

13. A hard disk drive comprising at least one apparatus according to claim 1.

14. A computer comprising at least one hard disk drive according to claim 13.

15. A system comprising:
at least one apparatus according to claim 1, and
the electromagnetic load.

16. The system according to claim 15, wherein the electromagnetic load is a voice coil motor.

* * * * *